M. J. YOUNG.
WATERING DEVICE.
APPLICATION FILED MAR. 14, 1919.
1,307,429.
Patented June 24, 1919.
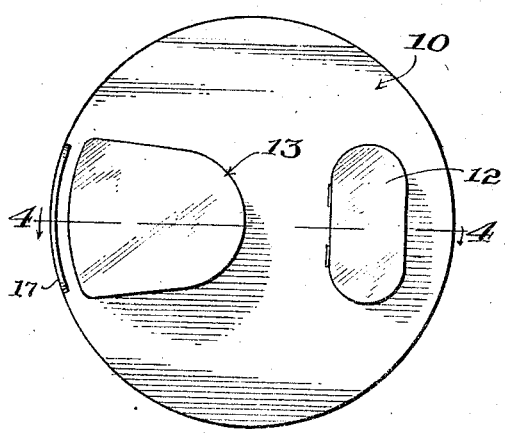
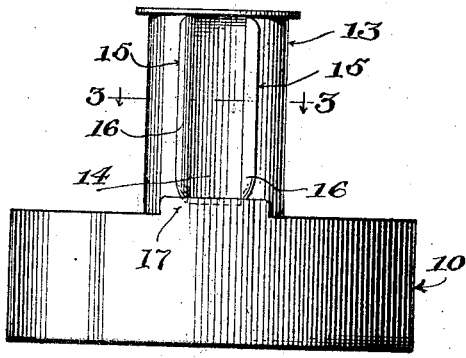
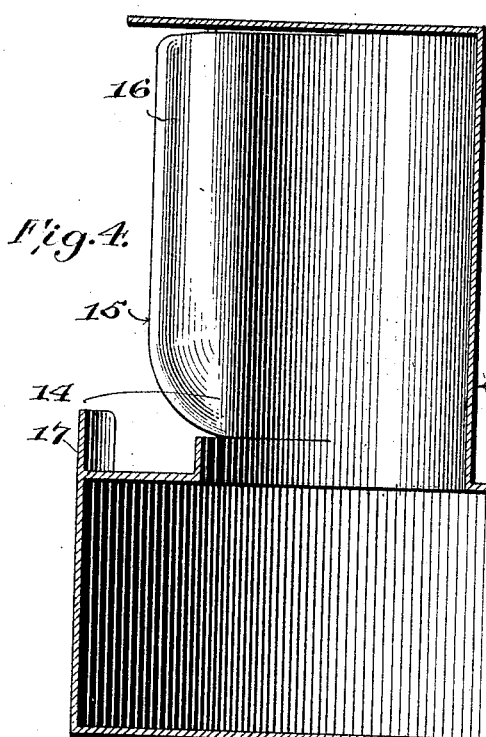
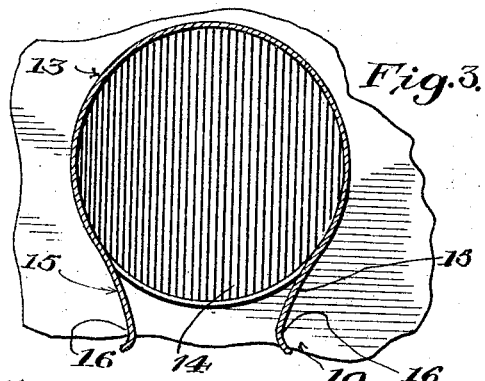
Witness
Inventor
M. J. Young
By Henry T. Bright
Attorney

UNITED STATES PATENT OFFICE.

MICHAEL J. YOUNG, OF STOCKTON, CALIFORNIA.

WATERING DEVICE.

1,307,429.

Specification of Letters Patent. Patented June 24, 1919.

Application filed March 14, 1919. Serial No. 282,622.

*To all whom it may concern:*

Be it known that I, MICHAEL J. YOUNG, residing at Stockton, in the county of San Joaquin and State of California, have invented certain new and useful Improvements in Watering Devices, of which the following is a specification.

My invention relates to watering devices and while it is particularly adapted for watering domestic rabbits certain principles of construction embodied therein could be utilized in providing watering devices for other domestic animals.

My purpose is to provide a watering device which will prevent contamination of the contained water as a result of the well known habits of rabbits when drinking and which at the same time will always permit a free access of the rabbit to the water. To this end I provide a device having a novel structure of drinking entrance which will restrict the use of the device to one rabbit at a time and prevent the animal, when drinking, from shaking accumulated dirt from his feet into the water in accordance with the well known habits of such animals.

It is also my purpose to provide a watering device of this character which will be simple in construction, efficient in use, and which can be manufactured at an exceedingly small cost.

With the above and other objects in view the invention consists in the details of construction and in the arrangement and combination of parts to be hereinafter more fully described and particularly pointed out in the claims.

In describing the invention in detail reference will be had to the accompanying drawings wherein like characters of reference denote corresponding parts in the several views, and in which Figure 1 is a plan view of a watering device constructed in accordance with my invention;

Fig. 2, a front elevation of same;

Fig. 3, a section on the line 3—3 of Fig. 2; and

Fig. 4, a section on the line 4—4 of Fig. 1.

Referring to the drawing my improved watering device is shown as comprising a water container 10 constructed preferably of aluminum and cylindrical in shape although any other desired material and shape may be utilized. The top of the container is provided with a suitable filling opening 11 adapted to be closed by a hinged cap 12. Rising from the top of the container 10 is a tubular extension 13 whose interior is in communication with the interior of the container. The upper end of this container is closed and the side thereof is provided with a drinking opening 14. Projecting laterally from the extension 13 at each side of the opening 14 are resilient guard ears 15 spaced apart a distance less than the width of the head of the animal to be watered, but capable of yielding outwardly under pressure so that the animal can force his head through to a position to partake of water in the container 10. In this manner the use of the device is restricted to one animal at a time. The free ends of the ears 15 are curved outwardly as at 16 so as to afford easy initial insertion of the head of the animal therebetween and to eliminate the possibility of injury as a result of exposed sharp edges. The ears 15 can be constructed in any suitable manner, but preferably by continuing the ends of the side wall of the extension and bending such continuation outwardly.

As a further guard against contamination of the water in the container by the animals and particularly by rabbits I provide an upstanding ledge 17 or projection directly in front of the opening 14 which serves as a stop for the feet of the rabbit when drinking and in this way the natural tendency of the rabbit to shake the dirt from his feet into the water is overcome and complete protection of the water against contamination had.

I claim:—

1. In a watering device of the class described, the combination of a water container, a tubular extension rising from the top of said container with its interior in communication with the interior of the container and having an opening in its side wall affording entrance to the contained water, and laterally directed resilient ears at the sides of said opening.

2. In a watering device of the class described, the combination of a water container, a tubular extension rising from the top of said container with its interior in communication with the interior of the container and having an opening in its side wall affording entrance to the contained water, and laterally directed resilient ears at the sides of said opening formed by a continuation of the ends of the side wall of said extension.

3. In a watering device of the class described, the combination of a water container, a tubular extension rising from the top of said container with its interior in communication with the interior of the container and having an opening in its side wall affording entrance to the contained water, and laterally directed resilient ears at the sides of said opening, the free ends of said ears being curved outwardly.

4. In a watering device of the class described, the combination of a water container, a tubular extension rising from the top of said container with its interior in communication with the interior of the container and having an opening in its side wall affording an entrance to the contained water, laterally directed resilient ears at the sides of said opening, and a vertical ledge on the container in line with the opening.

In testimony whereof, I affix my signature in the presence of two witnesses.

MICHAEL J. YOUNG.

Witnesses:
MAX GRIMM,
EFFIE C. GRIMM.

Copies of this patent may be obtained for five cents each, by addressing the "Commissioner of Patents, Washington, D. C."